US012807471B2

(12) United States Patent
Fuhrmeister

(10) Patent No.: US 12,807,471 B2
(45) Date of Patent: Nov. 24, 2026

(54) MAGNETIC FLUID ASSIST DEVICES

(71) Applicant: Todd D. Fuhrmeister, North Pole, AK (US)

(72) Inventor: Todd D. Fuhrmeister, North Pole, AK (US)

( * ) Notice: Subject to any disclaimer, the term of this patent is extended or adjusted under 35 U.S.C. 154(b) by 0 days.

(21) Appl. No.: 19/050,434

(22) Filed: Feb. 11, 2025

(65) Prior Publication Data

US 2025/0276889 A1 Sep. 4, 2025

Related U.S. Application Data

(63) Continuation-in-part of application No. 18/970,216, filed on Dec. 5, 2024, now abandoned.

(60) Provisional application No. 63/606,303, filed on Dec. 5, 2023.

(51) Int. Cl.
*B67D 7/38* (2010.01)
*B67D 7/04* (2010.01)

(52) U.S. Cl.
CPC .................................... *B67D 7/38* (2013.01); *B67D 7/04* (2013.01)

(58) Field of Classification Search
CPC ............ B67D 7/04; B67C 11/02; B67C 11/00
See application file for complete search history.

(56) References Cited

U.S. PATENT DOCUMENTS 5,960,907 A * 10/1999 Chau ....................... B67C 11/00 141/97
8,210,572 B2 * 7/2012 Davis .................... F16L 37/004 285/9.1
8,425,687 B2 4/2013 Keigler
9,279,527 B2 3/2016 Davis
10,696,530 B2 6/2020 Springer
11,470,904 B2 * 10/2022 Stahl ...................... A42B 3/048
12,025,038 B2 7/2024 Haynam et al.
(Continued)

FOREIGN PATENT DOCUMENTS

CN 104235544 12/2014
CN 210687420 6/2020

OTHER PUBLICATIONS

MagFitt 4" Magnetic Hose Connector / Woodcraft, https:www.woodcraft.com/products/magfitt-4-magnetic-hose-connector, accessed Dec. 6, 24, 16 pages.

(Continued)

*Primary Examiner* — Jason K Niesz

(74) *Attorney, Agent, or Firm* — Thorpe North & Western LLP.

(57) ABSTRACT

A magnetic fluid assist device can include a reservoir adapted to retain a fluid and a magnetic surface coupler attached to the reservoir. The magnetic surface coupler can magnetically connect to a surface supporting a target item, such as a seized joint. The surface coupler can also include a gasket configured to provide a fluid-sealed interface between the surface coupler and a target item. The device can also be configured for applying fluid to an inverted surface by including a rod extending along an interior central axis of the device, from an end of the reservoir opposite the target item, toward the target item. The rod can include a magnet affixed to an end corresponding to the target item and an adjustable nut configured for modifying an axial position of the magnet. The nut can be configured to enable control of a distance between the magnet and the target item.

16 Claims, 5 Drawing Sheets

(56) References Cited

U.S. PATENT DOCUMENTS

| | | | | |
|---|---|---|---|---|
| 12,083,447 | B2 | 9/2024 | Andrews et al. | |
| 12,129,083 | B2 * | 10/2024 | Maggiolo ............ | B65D 25/282 |
| 2010/0066082 | A1 | 3/2010 | Aubert et al. | |
| 2015/0232319 | A1 * | 8/2015 | Wedderburn .......... | B67D 7/005 138/89 |
| 2024/0060587 | A1 | 2/2024 | Zoe | |
| 2024/0392904 | A1 | 11/2024 | Jaeger et al. | |

OTHER PUBLICATIONS

Magvent Dryer Vent—Magnetic Dryer Vent / Dryer Vent Hose Replacement, https://www.magvent-dryervent.com, accessed Dec. 6, 24, 7 pages.

* cited by examiner

MAGNETIC FLUID ASSIST DEVICES

CROSS REFERENCE TO RELATED APPLICATIONS

This application is a continuation in part of U.S. Non-provisional patent application Ser. No. 18/970,216, filed Dec. 5, 2024 which claims priority to U.S. Provisional Patent Application No. 63/606,303, filed Dec. 5, 2023, both of which are incorporated herein by reference.

BACKGROUND

Penetrating fluids, commonly known as penetrating oils or rust dissolvers, are widely used for loosening rusted or seized metal parts, facilitating the disassembly of mechanical components, and providing lubrication to enhance the performance of machinery. Traditional application methods, however, pose challenges when dealing with vertical or inverted surfaces, as the fluid tends to drip or run off, reducing the effectiveness of the technique.

Typical solutions to this problem include spray applicators and gel formulations. However, these solutions are still subject to gravity moving the fluid from where it is needed, which can cause increased costs from waste and lead to contamination of the environment around the target area.

SUMMARY

This document describes a magnetic fluid assist device. The magnetic fluid assist device can include a reservoir housing adapted to retain a volume of fluid and a magnetic surface coupler attached to the reservoir housing. The magnetic surface coupler can magnetically seal against a surface that is supporting a target item, such as a seized joint or fastener.

In some examples, the magnetic fluid assist device can also include a common interface. For example, the reservoir housing can include a portion of a common interface and the magnetic surface coupler can include another portion of the common interface. Further, the portion of the common interface and the other portion of the common interface can be configured to fit together to provide a fluid-sealed connection between the reservoir housing and the magnetic surface coupler, the fluid-sealed connection enabling fluid communication between the reservoir housing and the magnetic surface coupler.

Additionally, the common interface can further include a sealing element. The sealing element can be integrated with the portion of the common interface, integrated with the other portion of the common interface, or be a separate element.

In additional examples, the magnetic surface coupler can include at least one magnetic element. The at least one magnetic element can include a magnetic ring or at least one magnet oriented about a perimeter of the magnetic surface coupler. Further, in some examples, the magnetic surface coupler can include a gasket configured to provide a sealed interface between the magnetic surface coupler and a target item for the fluid. Additionally, the reservoir housing can be made from a flexible material that allows the reservoir housing to be fitted around obstacles while maintaining the sealed interface between the magnetic surface coupler and the target item.

In further examples, the gasket that is configured to provide the sealed interface is affixed to an interface surface of the magnetic surface coupler. The interface surface can be configured as a substantially planar interface surface or a non-planar interface surface. Further, in some examples, a cross-sectional shape of the interface surface comprises at least one of: a circle, an ellipse, a rectangle, a triangle, or a combination of one or more of the above.

This document also describes a device for applying fluid to an inverted surface. The device for applying fluid to an inverted surface can include a tube with an open end, one or more magnets disposed around the open end, a gasket surrounding the open end for sealing against a surface, an opening at another end of the tube, opposite the open end, the opening configured to enable the addition of fluids into the tube, and a removable cap for sealing the opening. In some examples, the one or more magnets can be configured to secure the device to metal surfaces and seal the device to metal surfaces, via the gasket.

In some examples, the device for applying fluid to an inverted surface can also include a reservoir attached to the other end for holding fluids, the reservoir in fluid communication with the open end of the tube, via the opening at the other end of the tube. In some cases, the reservoir can be fitted with a removable cap for sealing the reservoir.

In additional examples, the device for applying fluid to an inverted surface can also include a rod extending along an interior central axis of the device, from a distal end of the reservoir opposite the other end of the tube, toward the open end of the tube, the rod penetrating the distal end of the reservoir via a fluid-sealed port. The device for applying fluid to an inverted surface can also include a central magnet affixed to an end of the rod that corresponds to the open end of the tube and an adjustable nut configured for modifying an axial position of the magnet. The adjustable nut can be configured to enable control of a distance between the central magnet and the surface to provide a fluid-sealed interface between the device and the surface and locking the central magnet in position. In some additional examples, the rod can also include a plunger configured to push fluid from the distal end of the reservoir toward the open end of the tube, effective to enable the fluid to maintain contact with the surface.

This document also describes a method for applying fluid to a target item. The method can comprise of connecting a reservoir of fluid to the target item using one or more magnets. The method can also include securing the reservoir to the target item while the reservoir is empty and adding penetrating oil fluid through a closeable opening. In some examples, the method can also include adjusting a position of the reservoir on the target item by manipulating the magnets.

In some examples, the reservoir includes a rod extending along an interior central axis of the reservoir, and at least one magnet attached to an end of the rod corresponding to an end of the reservoir configured for attachment to the target item, the rod penetrating the reservoir via a fluid-sealed port. The reservoir can also include an adjustable nut configured for modifying an axial position of the magnet. In such configurations, the method can also include securing the reservoir to the target item using the magnet on the rod, adjusting a distance between the magnet and the target item using the adjustable nut, and securing the magnet at the adjusted distance using the adjustable nut.

In additional examples, the rod also includes a plunger configured to push fluid toward the end of the reservoir configured for attachment to the target item. In such cases, the method can further comprise adjusting a distance between the plunger and the end of the reservoir configured for attachment to the target item, effectively to enable the fluid to maintain contact with the target item.

In other additional examples, the reservoir comprises a flexible reservoir, and the method can further comprise connecting the flexible reservoir to the target item using the magnets, conforming the flexible reservoir to an environment around the target item, and adding fluid to the flexible reservoir.

In this way, the magnetic fluid assist device can be used to securely hold a volume of a fluid, such as penetrating oil or fluid, in place on various surfaces, including horizontal, slanted, vertical, and inverted surfaces, to increase contact time and effectiveness.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
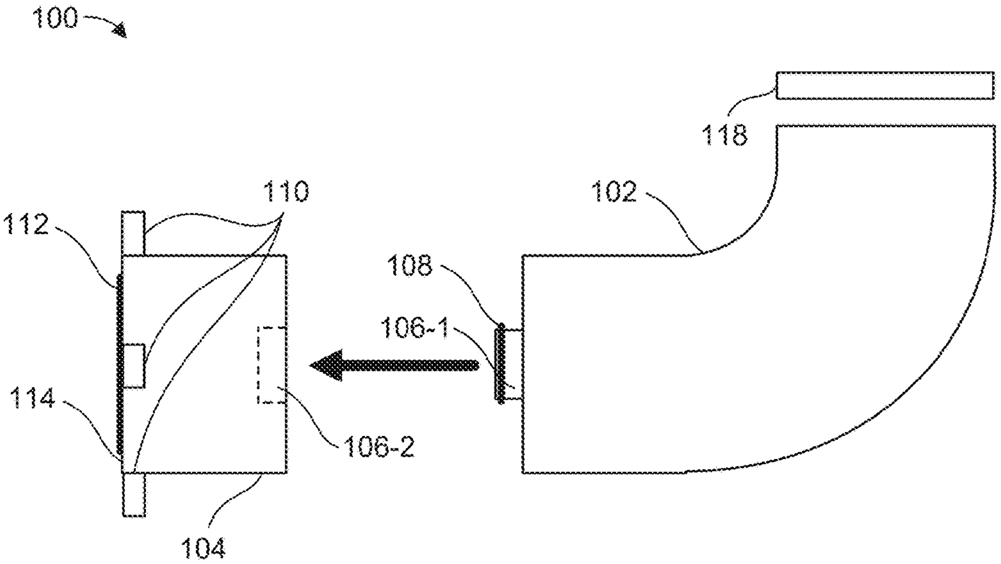
FIG. 1A illustrates an example implementation of a magnetic fluid assist device, which is suitable for use on vertical, horizontal, or slanted surfaces, according to some embodiments of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these example embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a magnet" includes reference to one or more of such materials and reference to "the interface" refers to one or more of such features.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

EXAMPLE EMBODIMENTS

A technology is described for applying penetrating fluid to surfaces, and, in various example implementations, for a device designed to enhance the effectiveness of fluids, such as rust dissolvers, penetrating oils or gels, or other fluids, on vertical, slanted, horizontal, or inverted surfaces in various configurations. An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In many environments, mechanical assemblies can become stuck or seized from rust, contaminants, or other causes. When the assembly needs maintenance, replacement, or other disassembly, fluids, such as penetrating fluids (and/or oils) and rust dissolvers are often used to loosen the seized parts. Typical application methods, however, can be less effective on vertical or inverted surfaces, as the fluid tends to drip or run off. The disclosed technology uses magnets to secure and seal a reservoir of penetrating fluid to an affected surface, which can reduce the amount of fluid needed and allow longer contact between the surface and the fluid. This can reduce costs by reducing the amount of needed fluid and the amount of cleanup necessary to address fluid that runs off the treated surface.

FIG. 1A illustrates an example implementation of a magnetic fluid assist device 100, which is suitable for use on vertical, horizontal, or slanted surfaces, according to some embodiments of the present disclosure. The example implementation includes a reservoir housing 102 adapted to retain a volume of fluid and a magnetic surface coupler 104 attached to the reservoir housing. In example implementations, the fluid can include a rust dissolver, a penetrating oil or gel, or a combination of such fluids.

Figure 2A:
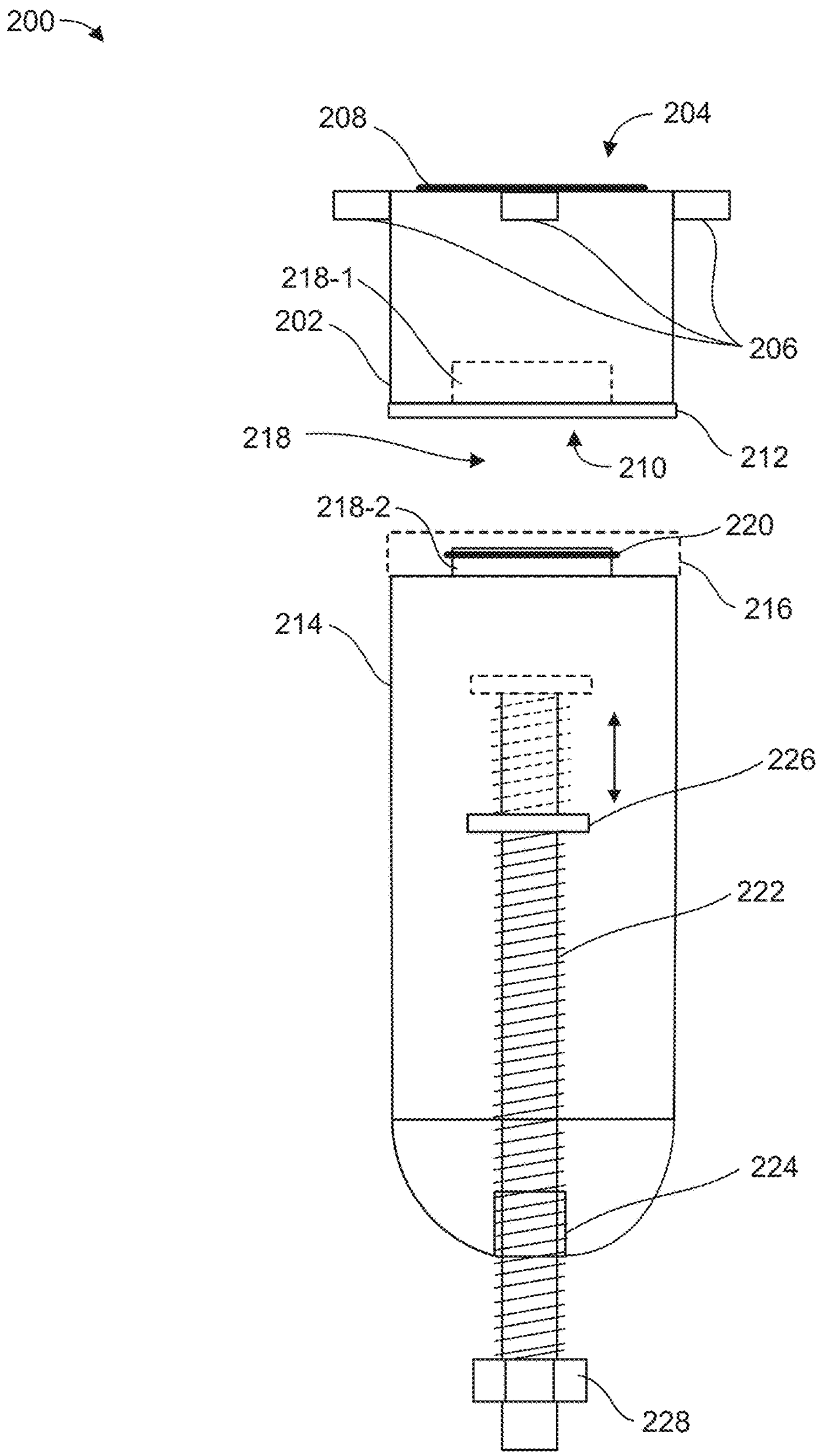
FIG. 2A illustrates another example implementation of a magnetic penetrating fluid assist device, which is suitable for use on inverted surfaces, as well as vertical, horizontal, or slanted surfaces, according to some embodiments of the present disclosure.
Figure 2B:
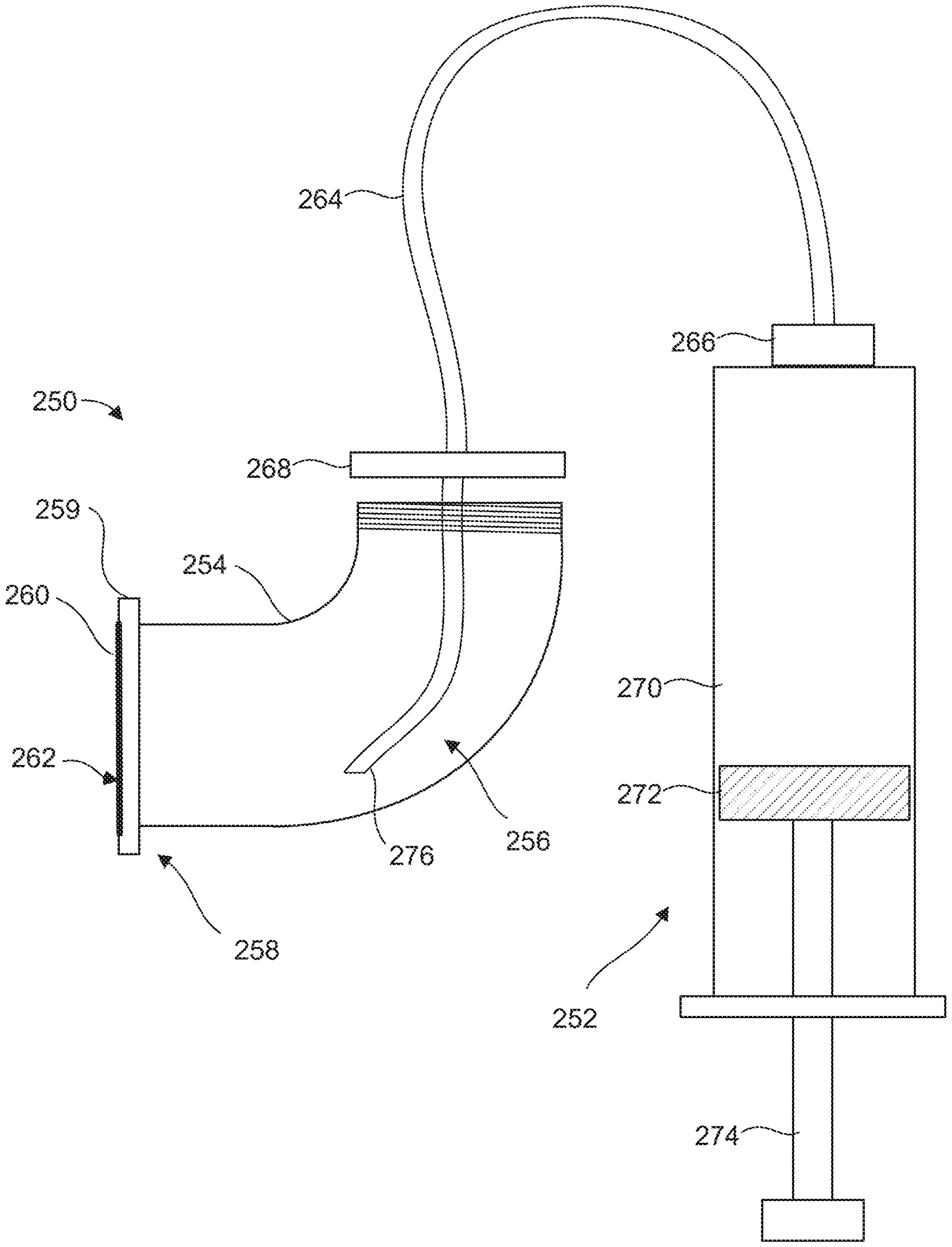
FIG. 2B illustrates an example implementation of a magnetic fluid assist device which includes a plunger delivery mechanism for the penetrating fluid, which is suitable for use on vertical, horizontal, or slanted surfaces, according to some embodiments of the present disclosure.

In some cases, the magnetic surface coupler 104 and the reservoir housing 102 can be integrated as a single unit (see FIG. 2B). However, in other cases, the magnetic surface coupler 104 and the reservoir housing 102 can be modular to allow for replaceable coupling for different sizes. The reservoir housing 102 can include a portion 106-1 of a common interface 106. The magnetic surface coupler 104 can include another portion 106-2 of the common interface 106. In some implementations, the portion 106-1 of the common interface and the other portion 106-2 of the common interface can be configured to fit together to provide a fluid-scaled connection between the reservoir housing 102 and the magnetic surface coupler 104. The fluid-sealed connection can enable fluid communication between the reservoir housing 102 and the magnetic surface coupler 104. In this way, the magnetic fluid assist device 100 can be used on horizontal, vertical, or slanted surfaces to increase the effectiveness of rust dissolvers, penetrating fluids, gels, and oils, and reduce waste and contamination from dripping fluid.

The common interface 106 can be realized as any of a variety of suitable interfaces that can be sealed and allow fluid to flow between the reservoir housing 102 and the magnetic surface coupler 104, such as threaded interface or a press-fit interface. As shown in FIG. 1A, the portion 106-1 is a plug and the other portion 106-2 is a receptacle that can receive the plug. In other implementations, the locations plug and receptacle may be switched between the reservoir housing 102 and the magnetic surface coupler 104. In some implementations, the common interface 106 also includes a sealing element 108. The sealing element 108 can be integrated with the portion 106-1 of the common interface (as shown in FIG. 1A), integrated with the other portion 106-2 of the common interface 106, or be a separate element. The sealing element 108 can be made from any suitable material and realized as any of a variety of sealing devices, including a gasket or an O-ring.

In some examples, the magnetic surface coupler 104 includes at least one magnetic element 110. The at least one magnetic element 110 can comprise a magnetic ring or at least one magnet oriented about a perimeter of the magnetic surface coupler 104. As shown in FIG. 1A, the magnetic surface coupler 104 includes four magnetic elements 110, spaced around the perimeter of the magnetic surface coupler 104 (for clarity, only three of the four magnetic elements 110 are shown in FIG. 1A). In other implementations, a different quantity or arrangement of magnetic elements 110 may be used.

In additional examples, the magnetic surface coupler 104 can include a gasket 112 that is configured to provide a sealed interface between the magnetic surface coupler 104 and a target item for the fluid. In other examples, the gasket may be replaced with another sealing element, such as an O-ring. In additional examples, the gasket that is configured to provide the sealed interface is affixed to an interface surface 114 of the magnetic surface coupler.

Figure 1B:
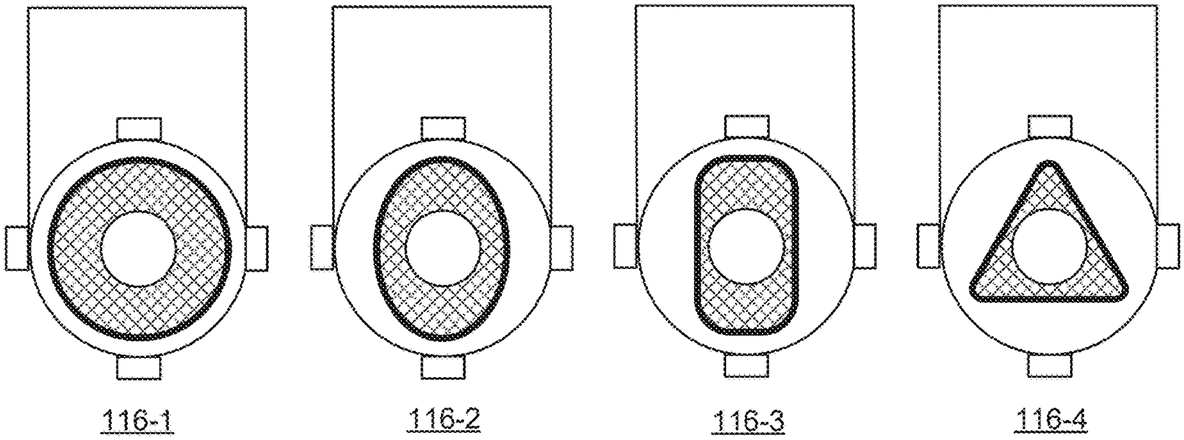
FIG. 1B illustrates example cross-sectional views of an interface surface included with the magnetic fluid assist device of FIG. 1A, according to some embodiments of the present disclosure.
Figure 1C:
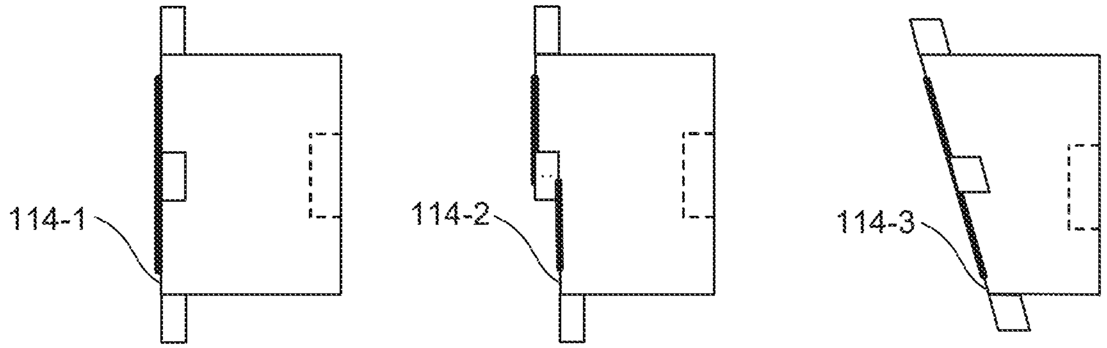
FIG. 1C illustrates side-views of example interface surfaces, each with a different planarity configuration, according to some embodiments of the present disclosure.

A cross-sectional shape of the interface surface 114 can be any of a variety of shapes, including, by way of non-limiting example, a circle, an ellipse, a rectangle, a triangle, or a combination of one or more of the above. Further, the interface surface 114 can be configured as a substantially planar interface surface or a non-planar interface surface, including by way of non-limiting example, substantially planar and non-planar. For example, FIG. 1B illustrates four example cross-sectional views 116 (116-1, 116-2, 116-3, and 116-4), each with different cross-sectional shapes (e.g., circular, elliptical, rectangular, and triangular). Further, any shape can also be made in different sizes, as appropriate to the shape of the target item. Similarly, FIG. 1C illustrates side-views of three example interface surfaces 114 (114-1, 114-2, and 114-3), each with different planarity (e.g., substantially planar, stepped, and slanted). It is noted that other planarity configurations (not shown in FIG. 1C) can also be used with the example magnetic fluid assist device 100.

Returning to FIG. 1A, in some implementations, the reservoir housing 102 can also include a removable cap 118 to retain fluids in the reservoir housing 102 after filling. Although not shown on FIG. 1A, the removable cap 118 may be secured to the reservoir housing 102 by various means (e.g., a leash or captive screw mechanism) to reduce the likelihood of losing the removable cap 118.

Figure 1D:
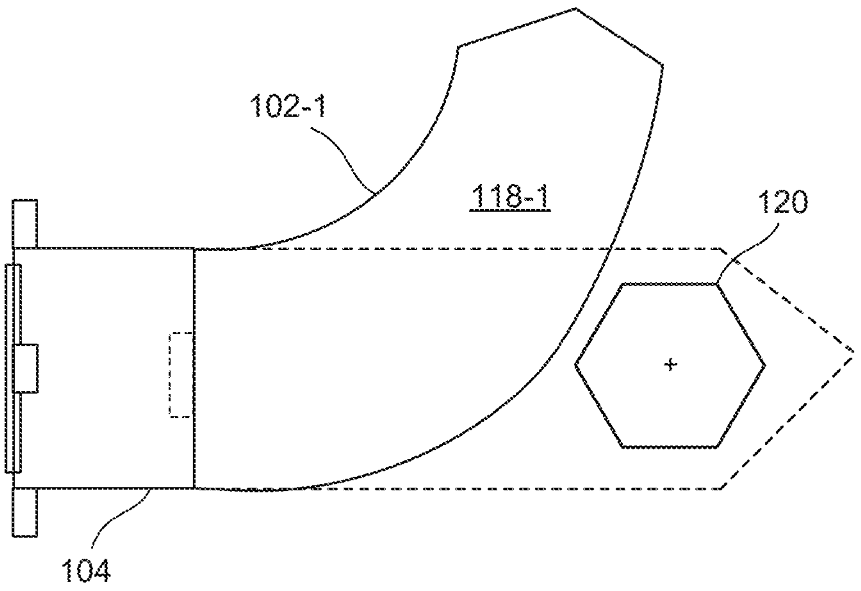
FIG. 1D illustrates an example magnetic fluid assist device that includes a flexible reservoir housing, according to some embodiments of the present disclosure.

In additional examples, the reservoir housing 102 can be made from any of a variety of suitable materials, including, for example, plastics, rubbers, metals, and silicone. In additional implementations, the reservoir housing 102 can be made from flexible material that allows a user to conform the reservoir around obstacles while maintaining the sealed interface between the magnetic surface coupler and the target item. For example, FIG. 1D illustrates an example magnetic fluid assist device 100-1 that includes a flexible reservoir housing 102-1 and a magnetic surface coupler 104 (as described with reference to FIGS. 1A through 1C). The flexible reservoir housing 102-1 is configured as a tray for holding fluid and includes a removable cap 118-1 to hold the fluid within the flexible reservoir housing 102-1. The view in FIG. 1D is a top view of the flexible reservoir housing 102-1 and the removable cap 118-1. As shown, the example magnetic fluid assist device 100-1 has been flexed around an obstructing bolt-head 120. In this case, the bolt-head 120 is not a target of loosening but is rather an obstruction to the reservoir. Of course, other obstructions can be avoided with such a flexible reservoir such as, but not limited to, flanges, protrusions, struts, supports, and the like. The unflexed position of the flexible reservoir housing 102-1 is shown in dashed lines.

FIG. 2A illustrates another example implementation of a magnetic fluid assist device 200, which is suitable for use on inverted surfaces, as well as vertical, horizontal, or slanted surfaces, according to some embodiments of the present disclosure. The example implementation includes a tube 202 with an open end 204 and one or more magnets 206 disposed around the open end 204. The example implementation also includes a gasket 208 surrounding the open end 204 for sealing against a surface and an opening 210 at another end of the tube opposite the open end 204. In some examples, the gasket 208 can be configured as an O-ring. The opening 210 can be configured to enable the addition of fluids into the tube 202. In some implementations, the example device also includes a removable cap 212 for sealing the opening 210.

In some example implementations, the magnets 206 can be configured to secure the device 200 to metal surfaces and seal the device 200 to metal surfaces, via the gasket 208. In some additional examples, the magnets 206 can be a magnetic ring or at least one magnet oriented about a perimeter of the tube 202. As shown in FIG. 2A, the one or more magnets 206 include four magnetic elements, spaced around the perimeter of the tube 202 (for clarity, only three of the four magnets are shown in FIG. 2A). In other implementations, a different quantity or arrangement of magnets may be used.

In some examples, the example device 200 also includes a reservoir 214 attached to the other end opposite the open end 204. The reservoir 214 can be configured for holding fluids. Further, the reservoir 214 is in fluid communication with the open end 204 of the tube 202, via the opening 210. In some implementations, the reservoir 214 can be fitted with a removable cap 216 for sealing the reservoir (for clarity, the removable cap 216 is shown with dashed lines). As noted above, either or both of the removable caps 212 and 216 may be secured to the tube 202 and the reservoir 214, respectively, by various means (e.g., a leash or captive screw mechanism) to reduce the likelihood of losing either or both of the removable caps 212 and 216.

In additional examples, the tube 202 can include a portion 218-1 of a common interface 218. The reservoir 214 can include another portion 218-2 of the common interface 218. In some implementations, the portion 218-1 and the other portion 218-2 can be configured to fit together to provide a fluid-sealed connection between the tube 202 and the reservoir 214. The fluid-sealed connection can enable fluid communication between the tube 202 and the reservoir 214. In this way, the example magnetic fluid assist device 200 can be used on inverted, horizontal, vertical, or slanted surfaces to increase the effectiveness of rust dissolvers, penetrating fluids, gels, and oils, and reduce waste and contamination from dripping fluid.

The common interface 218 can be realized as any of a variety of suitable interfaces that can be sealed and allow fluid to flow between the tube 202 and the reservoir 214, such as threaded interface or a press-fit interface. As shown in FIG. 2A, the portion 218-2 is a plug and the other portion 218-1 is a receptacle that can receive the plug. In other implementations, the locations plug and receptacle may be switched between the tube 202 and the reservoir 214. In some implementations, the common interface 218 also includes a sealing element 220. The sealing element 220 can be integrated with the other portion 218-2 of the common interface 218 (as shown in FIG. 2A), integrated with the portion 218-1 of the common interface 218, or be a separate element. The sealing element 220 can be made from any suitable material and realized as any of a variety of sealing devices, including a gasket or an O-ring.

In some example implementations, the device 200 can also include a rod 222 that extends along an interior central axis of the device 200, from a distal end of the reservoir 214 opposite the other end 210 of the tube, toward the open end 204 of the tube. In some cases, the rod 222 penetrates the distal end of the reservoir 214 via a fluid-sealed port 224. The device 200 can also include a central magnet 226 affixed to an end of the rod 222 that corresponds to the open end 204 of the tube 202.

The device 200 can also include an adjustable nut 228 configured for modifying an axial position of the magnet. The adjustable nut 228 can be configured to enable control of a distance between the central magnet 226 and the surface to provide a fluid-sealed interface between the device and the surface. The adjustable nut 228 can also enable locking the central magnet 226 in position. In this way, the example device 200 (with fluid inside) can be attached and secured to an inverted surface with the central magnet 226 (and or the magnets 206) and create a seal against the surface. Notably, the central magnet 226 can be used alone as the magnetic element, or can include periphery magnets 206. In some additional examples, the rod 222 can also include a plunger (not shown in FIG. 2A) that is configured to push fluid from the distal end of the reservoir 214 toward the open end 204 of the tube 202. The plunger can thereby be effective to enable the fluid to maintain contact with the surface. In implementations that include the plunger, the tube 202 can also include a pressure-release mechanism to allow air in the headspace to escape as the fluid level rises (not shown in FIG. 2A). For example, one or more one-way valves oriented around a circumference of the reservoir 214, near the other end 210 of the tube 202.

FIG. 2B illustrates another variation of the magnetic fluid assist device 250 which includes a plunger delivery mechanism 252 for the penetrating fluid. In this example, the magnetic fluid assist device 250 includes a reservoir housing 254 which is configured to retain a penetrating fluid within the reservoir 256. A magnetic surface coupler 258 can include one or more magnetic elements 259. The magnetic elements can include a single ring magnet (as illustrated) or multiple magnetic elements (see FIG. 1A) oriented around a periphery of a contact opening. As with the other examples described herein, the contact opening can allow fluid to pass from the reservoir to a corresponding surface which includes a fastener to be loosened. An optional gasket 260 can be used to create a seal between the reservoir housing 254 and the surface (not shown) at an interface surface 262.

The plunger delivery mechanism 252 can include a flexible hose 264 which is fluidly connected between a plunger outlet 266 and a reservoir cap 268. The reservoir cap 268 can be engaged via a threaded connection or other suitable securing mechanism (e.g. interference, detents, etc). The plunger delivery mechanism 252 can include a main fluid reservoir body 270 and a sliding piston 272 which is actuated via a handle 274 to force fluid from inside the reservoir body 270 into the flexible hose 264 and into the reservoir 256 for contact with the fastener. In one option, an outlet end 276 of the flexible hose 264 can be inserted into the reservoir 256 to allow withdrawal of the penetrating fluid.

Figure 3:
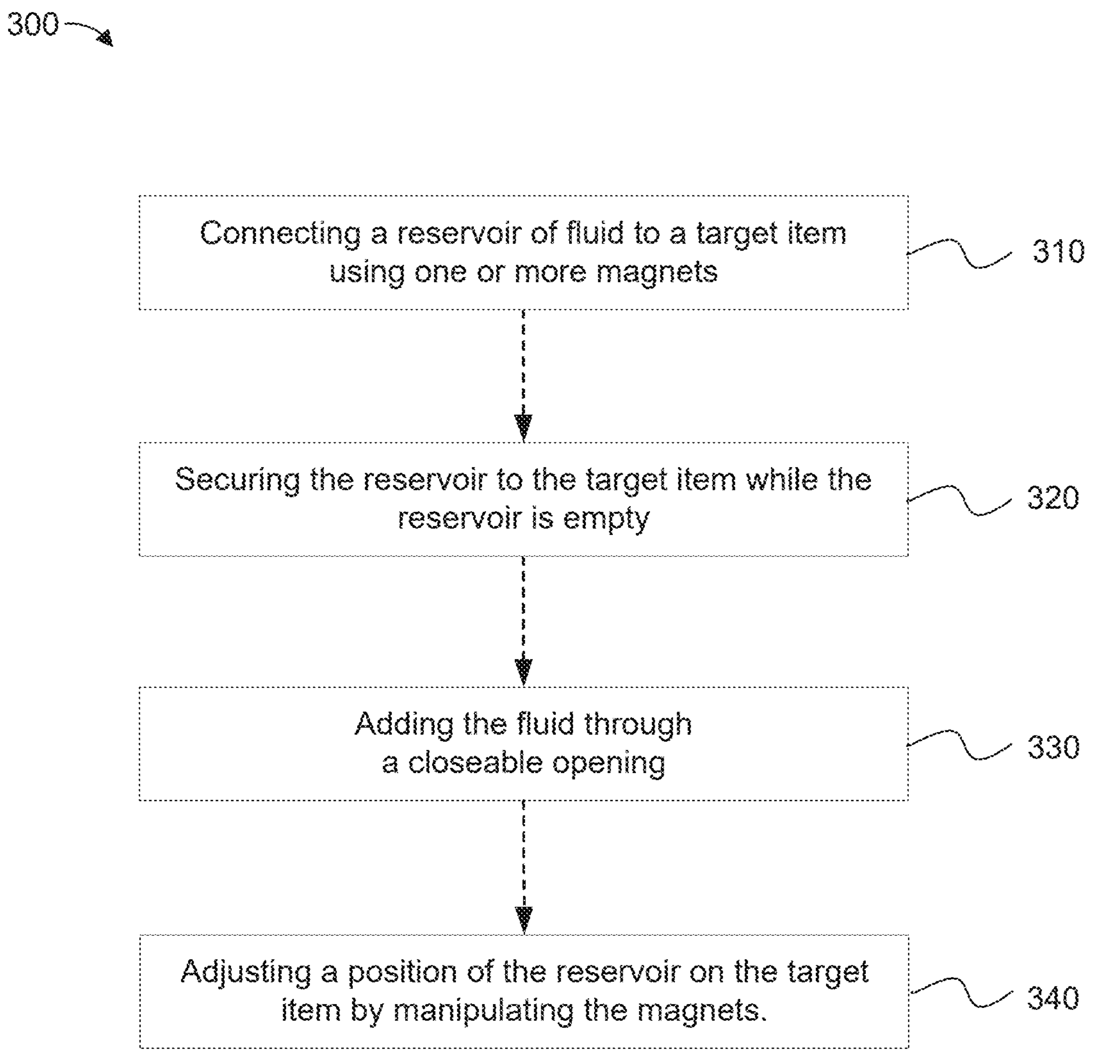
FIG. 3 is a flowchart illustrating an example method of applying fluid to target items, according to some embodiments of the present disclosure.

In addition to the example magnetic fluid assist devices described above, the present disclosure also describes methods of using the magnetic fluid assist devices. FIG. 3 is a flowchart illustrating an example method 300 of applying fluid to target items, according to some embodiments of the present disclosure. The method 300 can be implemented using some or all of the magnetic fluid assist devices, features, and techniques described above with reference to FIG. 1A through FIG. 2B.

The method includes, at block 310, connecting a reservoir configured to hold fluid to the target item using one or more magnets. In some cases, the connection of the reservoir can be achieved via any of the magnetic surface couplers 104 described with reference to FIG. 1A through FIG. 2. In example implementations, the fluid can include a rust dissolver, a penetrating oil or gel, or a combination of such fluids.

Further, the example method 300 can include additional optional steps 320-340. For example, at block 320, the method further includes securing the reservoir to the target item while the reservoir is empty. At block 330, the method also includes adding fluid through a closeable opening. The method can also include, at block 340, adjusting a position of the reservoir on the surface by manipulating the magnets.

In some cases, the reservoir can be configured as a flexible reservoir. In those configurations, the method 300 can optionally include (not shown in FIG. 3) one or more of: connecting a flexible reservoir to the target item using the magnets, conforming the flexible reservoir to an environment around the target item, and adding fluid to the flexible reservoir.

Additionally, in some cases similar to those described above, the reservoir can include a rod extending along an interior central axis of the reservoir and at least one magnet attached to an end of the rod corresponding to an end of the reservoir configured for attachment to the target item. The rod can penetrate the reservoir via a fluid-sealed port. The reservoir can also include an adjustable nut configured for modifying an axial position of the magnet.

In those configurations, the method 300 can include additional optional steps (also not shown on FIG. 3). For example, the method can further include securing the reservoir to the target item using the magnet on the rod, adjusting a distance between the magnet and the target item using the adjustable nut, and securing the magnet at the adjusted distance using the adjustable nut.

In additional examples, the rod can also include a plunger configured to push fluid toward the end of the reservoir configured for attachment to the target item. In those configurations, the method can further comprise (also not shown on FIG. 3) adjusting a distance between the plunger and the end of the reservoir configured for attachment to the target item, effective to enable the fluid to maintain contact with the target item.

Examples

Three nuts were welded to a ⅛" piece of steel and mounted in a vice. Each fastener was dipped in a solution of iodized salt, white vinegar, and hydrogen peroxide then torqued to 40 ft/lbs using a click type torque wrench in order to accelerate rusting. The fasteners were left overnight to corrode. About 12 hours later the control fastener was treated with PB BLASTER penetrating spray on both the front and the back side of the fastener and left to soak for over 12 hours. The test fastener was covered with the penetrating fluid applicator (as illustrated in FIG. 2B), filled at least half full with PB BLASTER penetrating fluid, and left to soak for over 12 hours.

When removing the fasteners the same torque wrench was used on increasing torque settings until the fastener broke loose without activating the click action on the torque wrench. The distance the penetrating fluid traveled into the threads was also observed.

Six tests were conducted and recorded, resulting in an average 7% reduction of torque needed to break loose the test fastener treated with the penetrating fluid applicator. These results were compared to the first fastener that was not treated with penetrating fluid and showed there was not a reliable difference between the untreated fastener and the fastener that was only sprayed using the aerosol can. Further, there was a 75% reduction of wasted fluid per test when the excess from the invention test bolt was drained into a cup and reused. In addition, virtually no fluid contaminated the floor when drained properly.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

These examples, implementations, embodiments, and configurations collectively provide a comprehensive solution for applying fluids in diverse scenarios, offering improved efficiency and usability over existing methods of application. The solutions can also reduce waste and contamination in the application environment. In view of the limitations of the related art, the present invention represents a significant advancement in at least the field of penetrating fluid application devices, providing a versatile and effective solution for treating surfaces in various orientations.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A magnetic fluid assist device comprising:

a reservoir housing adapted to retain a volume of fluid within a reservoir defined by the reservoir housing, wherein the reservoir housing is a tube including an elbow bend adapted to allow retention of fluid within the reservoir against a vertical or slanted metal surface; and a magnetic surface coupler attached to the reservoir housing.

2. The device of claim 1, wherein:

the reservoir housing includes a portion of a common interface;

the magnetic surface coupler includes another portion of the common interface; and the portion of the common interface and the another portion of the common interface are configured to fit together to provide a fluid-sealed connection between the reservoir housing and the magnetic surface coupler, the fluid-sealed connection enabling fluid communication between the reservoir housing and the magnetic surface coupler.

3. The device of claim 2, wherein:

the common interface further comprises a sealing element; and the sealing element is:

integrated with the portion of the common interface;

integrated with the other portion of the common interface; or a separate element.

4. The device of claim 1, wherein the magnetic surface coupler includes at least one magnetic element.

5. The device of claim 4, wherein the at least one magnetic element comprises:

a magnetic ring; or at least one magnet oriented about a perimeter of the magnetic surface coupler.

6. The device of claim 1, wherein the magnetic surface coupler includes a gasket configured to provide a sealed interface between the magnetic surface coupler and a target item for the fluid.

7. The device of claim 6, wherein the reservoir housing is made from a flexible material that allows the reservoir housing to be fitted around obstacles while maintaining the sealed interface between the magnetic surface coupler and the target item.

8. The device of claim 6 wherein:

the gasket that is configured to provide the sealed interface is affixed to an interface surface of the magnetic surface coupler; and the interface surface is configured as:

a substantially planar interface surface; or a non-planar interface surface, and wherein:

a cross-sectional shape of the interface surface comprises at least one of: a circle, an ellipse, a rectangle, a triangle, or a combination thereof.

9. A method for applying fluid to a target item, comprising:

connecting the magnetic fluid assist device of claim 1 which is configured to hold fluid to the target item using one or more magnets of the magnetic surface coupler.

10. The method of claim 9, further comprising:

securing the reservoir to the target item while the reservoir is empty; and adding fluid through a closeable opening.

11. The method of claim 9, further comprising adjusting a position of the reservoir on the target item by manipulating the magnets.

12. The method of claim 9, wherein:

the reservoir comprises a flexible reservoir, and the method further comprises:

connecting the flexible reservoir to the target item using the magnets;

conforming the flexible reservoir to an environment around the target item; and adding fluid to the flexible reservoir.

13. A device for applying fluid to an inverted surface, comprising:

a tube with an open end;

one or more magnets disposed around the open end;

a gasket surrounding the open end for sealing against a surface;

an opening at another end of the tube, opposite the open end, the opening configured to enable addition of fluids into the tube;

a reservoir attached to the another end for holding fluids, the reservoir in fluid communication with the open end of the tube, via the opening at the other end of the tube;

a rod extending along an interior central axis of the device, from a distal end of the reservoir opposite the another end of the tube, toward the open end of the tube, the rod penetrating the distal end of the reservoir via a fluid-sealed port;

a central magnet affixed to an end of the rod that corresponds to the open end of the tube; and an adjustable nut configured for modifying an axial position of the magnet, the adjustable nut configured to enable:

control of a distance between the central magnet and the surface to provide a fluid-sealed interface between the device and the surface; and locking the central magnet in position; and a removable cap for sealing the opening.

14. The device of claim 13, wherein the one or more magnets are configured to:

secure the device to metal surfaces; and seal the device to metal surfaces, via the gasket.

15. The device of claim 13, wherein the reservoir is fitted with a removable cap for sealing the reservoir.

16. The device of claim 13, wherein the rod also includes:

a plunger configured to push fluid from the distal end of the reservoir toward the open end of the tube, effective to enable the fluid to maintain contact with the surface.

* * * * *